United States Patent [19]
Barry

[11] 3,962,613
[45] June 8, 1976

[54] POLYPHASE AC MOTOR CONTROL
[75] Inventor: Robert D. Barry, Lockport, N.Y.
[73] Assignee: Wer Industrial Division of Emerson Electric Co., Grand Island, N.Y.
[22] Filed: Jan. 31, 1973
[21] Appl. No.: 328,445

[52] U.S. Cl. .............................. 318/225 R; 318/227
[51] Int. Cl.² ............................................ N02P 5/40
[58] Field of Search .......................... 318/225, 227

[56] References Cited
UNITED STATES PATENTS

| | | |
|---|---|---|
| 2,579,574 | 12/1951 | Herchenroeder .................. 318/227 |
| 3,345,549 | 10/1967 | Hauser et al. ....................... 318/227 |
| 3,376,485 | 4/1968 | Shibata et al. ...................... 318/227 |
| 3,387,196 | 6/1968 | Graham et al. ..................... 318/227 |
| 3,582,737 | 6/1971 | Brown ................................. 318/227 |

Primary Examiner—Gene Z. Rubinson
Attorney, Agent, or Firm—Allen J. Jaffe

[57] ABSTRACT

A control for a polyphase a.c. motor having field coils, each of which is connected to first rectifiers connected to form a first junction and second rectifiers connected to form a second junction and a transistor controlling the current between the first and second junction in response to a control signal.

6 Claims, 1 Drawing Figure

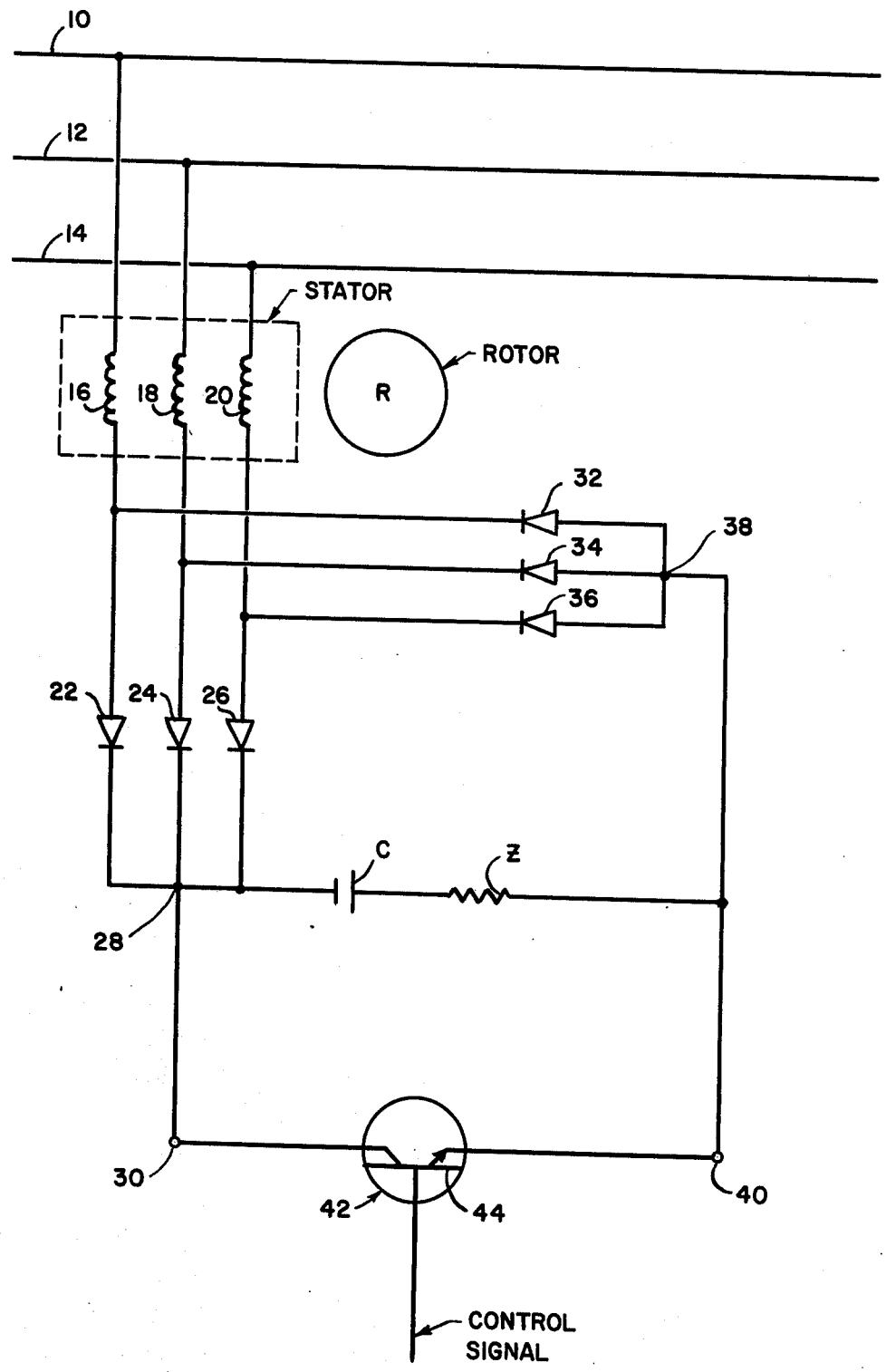

POLYPHASE AC MOTOR CONTROL

The present invention relates to the control of a.c. motors and, more particularly, to the control of polyphase alternating current type motors.

By way of example and not limitation the present invention finds particular application in the motors employed in the winding of yarn wherein it is important to control or maintain the tension of the yarn within predetermined ranges. The invention can also be applied to control speed, torque, tension, or position of the AC polyphase motor controlled device. In present systems a tension sensing device is mechanically linked to switching structure which functions to vary the value of resistances located in each phase of the polyphase motor to increase or decrease the torque thereof. With the field windings of such motor connected in a typical Y configuration it becomes necessary to locate such control switches and resistors in each leg of the field windings, adding significantly to the expense of controlling such motors. Additionally, since full motor current passes through such switches the life expectancy thereof is greatly shortened. As will be described hereinbelow the present invention eliminates the requirements of multiple switches and resistances to effectuate the torque or speed control of such motors.

The foregoing disadvantages are overcome according to the teachings of the present invention which provides a single controlling member which functions to vary the current in each of the field windings of a polyphase motor in response to a control signal such as that derived from a tension sensing device or simply a speed or tension varying potentiometer.

The apparatus according to the present invention incorporates a multiphase rectifier bridge circuit connected to each of the stator field windings in such a way that a single switching device such as a transistor operating in a switching mode can vary the current in each of the windings and thus vary the output torque of the motor.

According to one aspect of the present invention the conventional Y connection of the field coils of a polyphase motor is modified such that each leg contains suitable rectifying devices each of which in turn is connected with but one circuit element which performs a switching or current controlling function in response to a control signal which may vary the duty cycle of such element to thus vary the current through each of the field coils which in turn corrects the torque or speed of the motor.

Basically then the present invention provides a polyphase alternating current motor having a plurality of field or stator coils, first rectifying means in electrical communication with each of the coils and joined together at a first common junction, second rectifying means in electrical communication with each of the field coils and joined together at a second common junction, the first and second common junctions being in electrical communication and a single means for controlling the current flow between the first and second common junctions.

For a fuller understanding of the present invention reference should now be had to the following detailed description thereof taken in conjunction with the accompanying drawing wherein the only FIGURE is a schematic circuit representation of the polyphase motor control arrangement according to the present invention.

Referring now to the drawing, a polyphase alternating current supply line, typically a three phase power supply, is depicted schematically at 10, 12 and 14. The stator field coils 16, 18 and 20 for energizing the rotor R of a typical polyphase motor are depicted as connected respectively to lines 10, 12, and 14.

A first set of rectifying means in the form of rectifiers 22, 24 and 26 is located in communication with coils 16, 18 and 20, respectively, having the outputs thereof joined at a first common junction 28 leading to a terminal 30.

A second set of rectifying means in the form of rectifiers 32, 34, 36 is located in communication with the coils 16, 18 and 20, respectively, having the outputs thereof joined at a second common junction 38 leading to a terminal 40 opposite terminal 30.

Between terminals 30 and 40 is located a suitable current controlling means which may illustratively take the form of a transistor 42 operating in a switching mode. When the circuit is closed betweem terminals 30 and 40 full line current will flow through each of the field coils; when it is open no current will flow. The average value of current flowing through the coils and, thus, the torque or speed of rotor R can easily be controlled by varying the length of time that the circuit between terminals 30 and 40 is closed. A NPN transistor as illustrated is most suitable for this purpose in that the base 44 thereof can be forward biased by a control signal to allow current through for a variable amount of time depending upon the error signal (the amount of over tension or under tension in the case of yarn winding) with the dissipation of an insignificant amount of power across the transistors and the rectifiers. In this case the control signal can take the form of a pulse of a given width at a variable rate or of a varying width at a fixed rate as is known to those skilled in the art.

Alternatively, transistor 42 can function as a linear modulator of the current across 30 and 40. In this case proper limiting elements should be used to prevent failure of the transistor as is well known to those skilled in the art. A resistor Z and capacitor C is provided in parallel with the transistor as illustrated to limit voltage transients thereof as it switches off as is well known.

When incorporated in a yarn tension controlling system any well known technique for sensing tension and converting variations from a desired setting to an electrical control signal may be utilized. For example, the control signal at 44 may be derived from means sensing the tension of the yarn by responding to the displacement of a crank arm over which the yarn passes and is in contact with. Excessive tension in the yarn would cause the arm to rise under spring tension or the like whereas the arm would be lowered if more tension was required, as is well known. Many devices are available for converting this arm displacement to an electrical control signal, such as a photocell and light source part of which would be interrupted by the arm. The electrical output of the photocell could be converted to a variable pulse width signal for operating transistor 42 in a switching mode, as previously described.

Although a preferred embodiment of the invention has been disclosed and described, changes will occur to those skilled in the art. For example, instead of transistor 42 other elements such as variable resistors, gaseous or solid state devices can be used to control the current in the polyphase field coils.

I claim:

1. In a polyphase alternating current motor having a plurality of field coils each having one side connected to a source of polyphase current, the improvement comprising; a plurality of first rectifying means connected individually to said field coils and joined together to form a first junction, a plurality of second rectifying means connected individually to said field coils and joined together to form a second junction and a single means comprising a single controlling member connected between said first and second junction for varying the average current in each of said coils.

2. The apparatus according to claim 1, wherein said rectifying means comprises rectifiers.

3. The apparatus according to claim 2, wherein said means for varying the current comprises a switch.

4. The apparatus according to claim 3, wherein said switch comprises a transistor.

5. The apparatus according to claim 1, wherein said means for varying the current comprises a switch.

6. The apparatus according to claim 5, wherein said means for varying the current comprises a transistor.

* * * * *